March 31, 1959
M. E. NOBLE
2,879,598
EXTENSIBLE MEASURING ROD
Filed Oct. 31, 1955
2 Sheets-Sheet 1
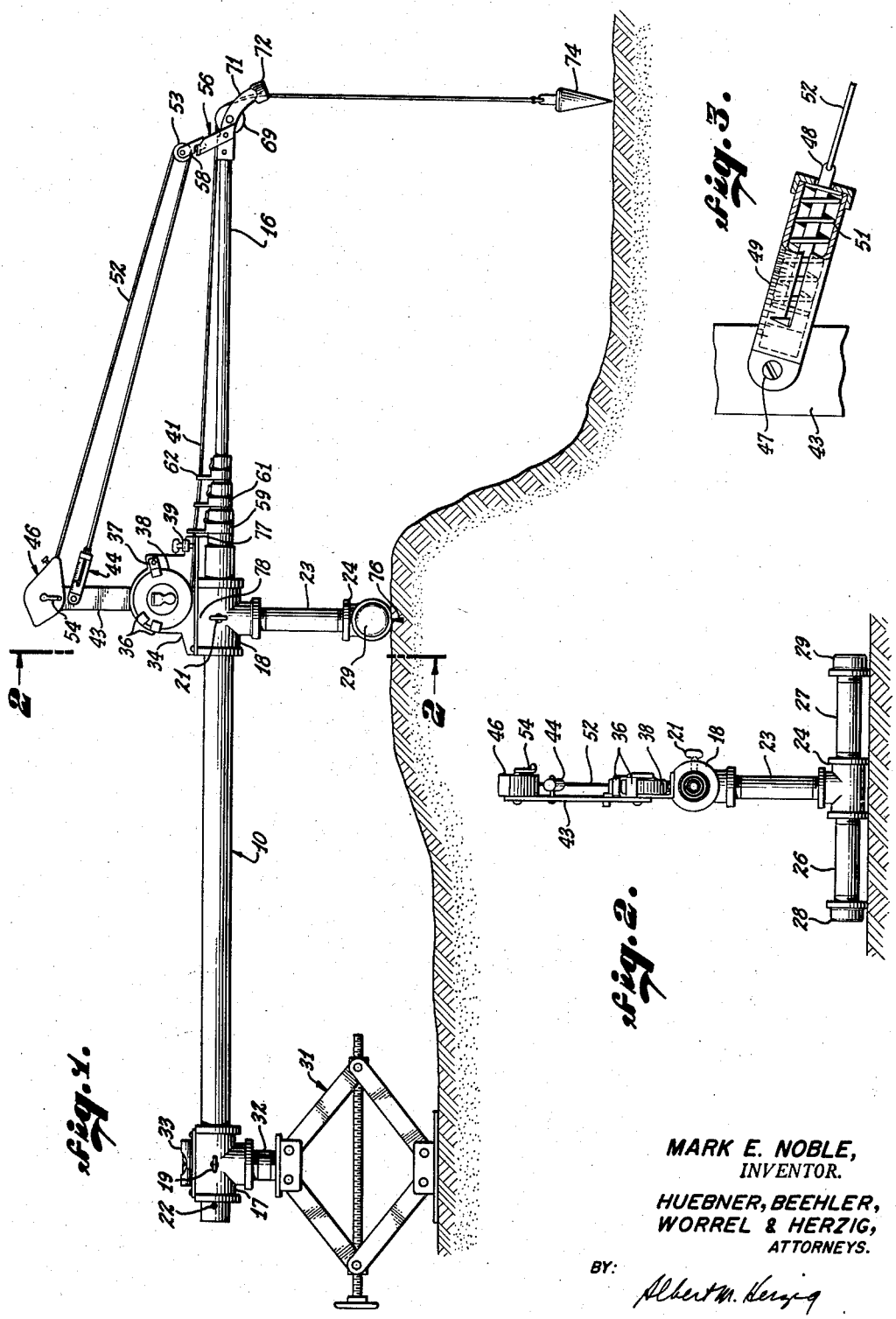
MARK E. NOBLE,
INVENTOR.
HUEBNER, BEEHLER,
WORREL & HERZIG,
ATTORNEYS.
BY:

March 31, 1959
M. E. NOBLE
2,879,598
EXTENSIBLE MEASURING ROD
Filed Oct. 31, 1955
2 Sheets-Sheet 2
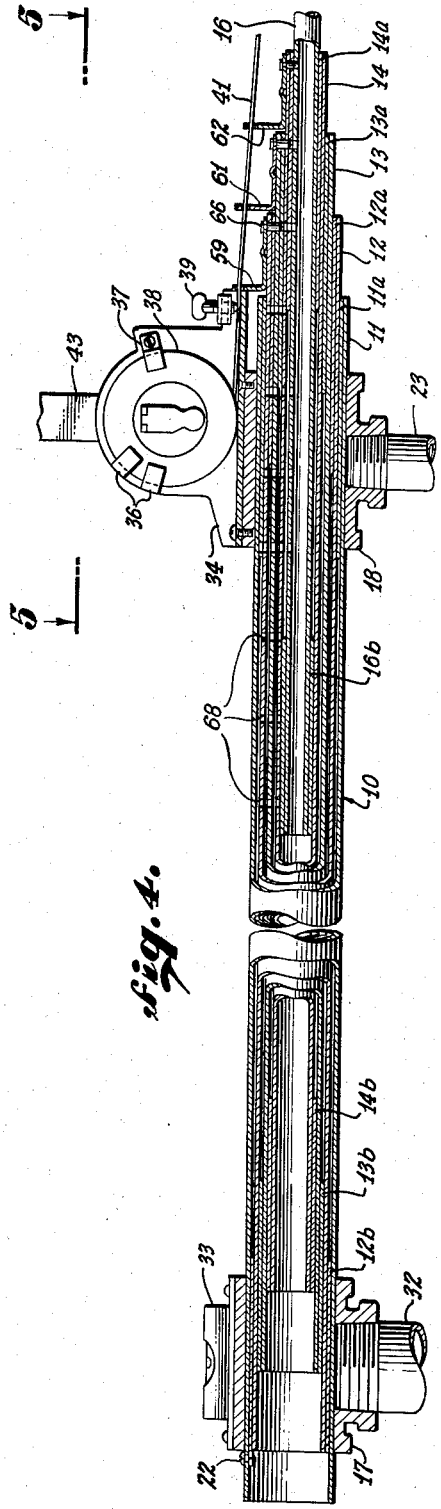
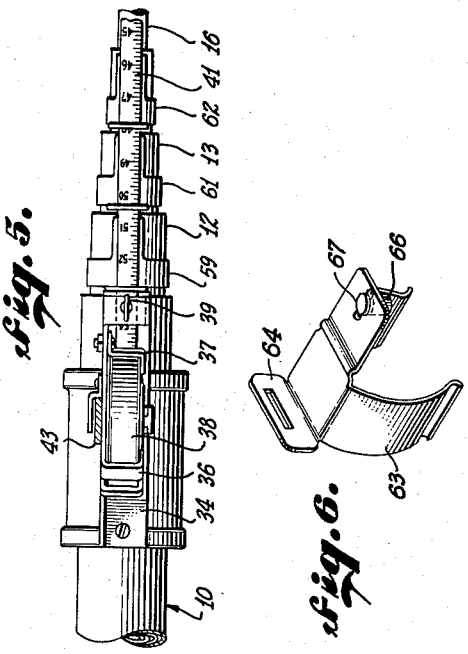
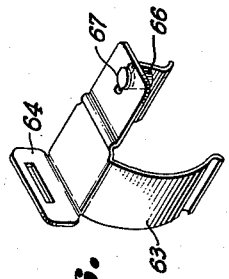
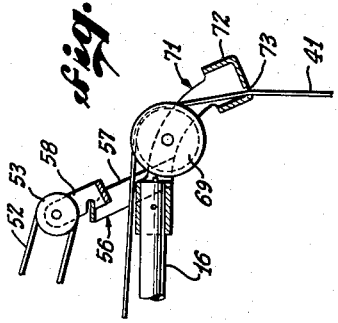
MARK E. NOBLE,
INVENTOR.
HUEBNER, BEEHLER,
WORREL & HERZIG,
ATTORNEYS.
BY:

United States Patent Office 2,879,598
Patented Mar. 31, 1959

2,879,598
EXTENSIBLE MEASURING ROD

Mark E. Noble, San Fernando, Calif.

Application October 31, 1955, Serial No. 543,864

2 Claims. (Cl. 33—125)

The present invention relates to a device for measuring distances from reference points to points projected in space, and particularly to an extensible rod and measuring means for measuring distances from reference points on a surface to points projected laterally from the reference points to sub-surface levels.

In many phases of engineering work it frequently is desirable to spot points with reference to other points. For example, in the construction of sewer lines, it is necessary to locate points and measure distances from reference points located on a surface, such as a street or highway surface. The points to be located, or measured, are spotted on the bottom of a ditch constructed to contain the sewer line and on various parts of the sewer, for example. These points generally are spaced laterally from the reference points and at levels below those of the reference points. Ordinary rules and tape measures are not suitable for such work because the measurements usually are made in space and in two directions, such as a horizontal direction and a vertical direction.

Accordingly, it is an important object of my invention to provide an extensible rod and measuring means for measuring distances horizontally and vertically from reference points to points projected laterally and downward from the reference points.

Another object is to provide a measuring means for accurately and conveniently measuring distances from reference points on a surface to points projected laterally and downward from the reference points.

A further object is to provide a convenient measuring means of ready portability and efficient design for rapidly and accurately spotting or checking distances from reference points on a street or highway surface to various points on a sewer or ditch below the level of the reference points and laterally projected therefrom.

Additional objects will become apparent from the following description:

Stated in general terms, my invention comprises an extensible rod means, preferably of telescoping design, leveling means, preferably for positioning the rod means in a generally horizontal position, and measuring means, preferably tape measure means, for measuring or determining distances from reference points to points to be spotted or located, such as laterally and downward from the reference points. The extensible rod means preferably also includes correction means for correcting or counteracting any sagging tendency in the rod means, especially when partially or entirely extended.

A more detailed description of a specific embodiment of my invention is given with reference to the drawings, wherein:

Figure 1 is a side elevational view showing an extensible measuring rod in a level, retracted position;

Figure 2 is a cross-sectional view taken on the line 2—2 of Figure 1;

Figure 3 is a partial detail view showing a spring scale used to correct for a sagging tendency in the rod when in an extended position;

Figure 4 is a partial detail side elevational view, partly in cross-section, showing the telescopic arrangement of the rod sections in the retracted position;

Figure 5 is a partial plan view taken on the line 5—5 of Figure 4;

Figure 6 is a partial perspective detail view showing one of the clips used on the ends of rod sections; and Figure 7 is a partial detail elevational view, partially in cross-section, showing details of construction at the end of the rod.

In the specific embodiment shown in the drawings, extensible rod 10 is made up of a group of tubular sections 11, 12, 13, 14, and 16 telescopically arranged for extension and retraction. Any number of tubes may be used instead of the five tubes shown in the specific embodiment of the drawings. Outer tube 11 is mounted in two T's 17 and 18 to be slidable therein or fixed therein by thumb screws 19 and 21. Bolt 22 adjacent the rear end of tube 11 serves as a stop.

Into T 18 is threaded a nipple 23, which in turn is threaded into a T 24 containing nipples 26 and 27, closed by caps 28 and 29, respectively. This arrangement serves as a front vertical leg provided with a horizontal base. Other designs and constructions of this leg and base can be employed. The one shown has the feature of low cost and convenience.

A jack 31 of any suitable design, such as the scissors jack shown in Figure 1, is connected to T 17 by a nipple 32 threaded into the T and the top of the jack. This arrangement serves as a rear leg and base adapted for vertical adjustment of the rear end of the extensible rod 10 so that the axis thereof can be set parallel or level to the horizontal at the zone of use of the rod for measurements.

To facilitate the leveling operation, a liquid level 33, for example, is attached to the top of T 17, which has been flattened for that purpose. Other leveling devices attached to other parts of the device can be used for this operation. In leveling the rod 10, the rear end thereof is raised or lowered by adjusting jack 31 in conventional manner until a bubble in level 33 indicates that the rod is horizontal or level.

A bracket 34 is attached to a flat top on T 18. The bracket 34 is provided with fingers 36 and a clip 37 to hold a conventional tape measure case 38. A thumb screw 39 is also carried on bracket 34 to serve as a clamp for tape measure 41 during use thereof, as shown in Figure 1. Attached to bracket 34 is a vertical post 43 carrying a spring scale 44 and a winch 46.

The spring scale 44 is pivotally fastened at its end to post 43 by a screw 47 and consists of a plunger-indicator 48, scale 49, and spring 51. The outer end of plunger-indicator 48 is connected to the free end of a wire 52 which passes around a pulley 53 to the winch 46. By turning handle 54, reproducible degress of tension can be produced in wire 52 as indicated on scale 49 by plunger-indicator 48. Other types or designs of tension application and tension indication means can be employed instead of winch 46 and spring scale 44.

The tension produced is translated from wire 52 to the end of innermost tubular rod 16 through a coupling 56. The coupling 56 can be of any convenient design. The one shown in Figure 7 consists of an inverted U-shaped link 57 fastened at its open ends to the end of innermost rod 16 and a block 58 on pulley 53 hooked into linking engagement with the closed end of link 57, as best shown in Figure 7.

The forward ends of inner, telescoped tubular sections 12, 13, and 14 are provided with clips 59, 61, and 62, respectively. These clips, as best shown in Figure 6, are provided with clamping portions 63, adapted to clamp around the end of a section. The clips also contain a guide slot portion 64, for guiding a tape measure 41 passed therethrough, as shown, and a pin 66 on a flexible portion 67 for insertion into a hole or holes 68 spaced longitudinally in the walls of the sections 12, 13, 14, and 16. The pins 66 serve to set the positioning of the sections in the extensible rod 10 relative to each other at various degrees of extension of the rod sections. Pins 66 can be retracted from holes 68 by pulling flexible portion 67 away from the section walls.

The outer end of innermost rod 16 is provided with a pulley 69 rotatably mounted on an arcuate holder 71. The holder 71 is attached to the end of rod 16 at one of its ends, and the other end of the holder 71, which curves downward, is provided with a thimble 72 provided with a slot 73 for passage therethrough of tape measure 41, as best shown in Figure 7. The outer end of tape measure 41 is attached to a plumb bob 74.

Inside the forward inner ends of tubular sections 11, 12, 13, and 14 are fixed, as by welding or soldering, short tubular sections 11a, 12a, 13a, and 14a, respectively, as shown in Figure 4. Similar short tubular sections 12b, 13b, 14b, and 16b are fixed outside the rearward ends of the sections 12, 13, 14, and 16, respectively. These short tubular sections are cooperatively positioned to serve as guide means and as stop means to limit the extension of the respective tubular sections.

The measuring rod shown in the drawings is used by placing the vertical axis of the front leg, that is the axis of nipple 23, above a reference point 76 and then leveling extensible rod 10, as previously described, by manipulating jack 31. The inner telescoped rod sections 12, 13, 14, and 16 are then extended to the desired degree for locating a point or making a measurement while winch 46 is set to pay out wire 52. Pins 66 of clips 59, 61, and 62 are manipulated, as described above, for extending the rod sections and for setting their extended relationship with respect to each other by inserting pins 66 in holes 68.

Wire 52 is then drawn taut by turning handle 54 of winch 46 until spring scale 44 indicates the desired degree of tension on scale 49. The tension produced in wire 52 in each case is that which previously has been found to be sufficient to accurately counteract the sagging tendency in the extended sections 12, 13, 14, and 16 for the extant degree of extension and setting of the sections. The desired degree of tension in wire 52 can be obtained in each case from a calibration table of tension and extension setting values previously determined and tabulated.

Thumb screw 39 is loosened and a length of tape measure 41 is supplied from case 38 until the tip of plumb bob 74 touches the point for which the distance is to be measured or checked. If a given distance is to be measured off, thumb screw 39 can be screwed tight on tape measure 41 to set the tape after the desired length thereof has been supplied from case 38. The reference point 77 for reading the tape 41 is displaced forward of the projected point 78 of reference point 76 a distance 77—78 to exactly correct for the excessive length of tape 41 payed out in rounding pulley 69 and arcuate holder 71. In this manner, the tape is made direct reading even through it passes around an arc instead of a sharp right angle at the outer end of innermost rod 16.

It will be observed that the measuring rod described above is readily portable because of its relatively light weight. The telescoping sections can be made of metal conduit such as steel or aluminum, for example, or of other suitable material such as plastic tubing. The measuring rod is conveniently manipulated and produces accurate results.

The foregoing description is given primarily to illustrate a specific embodiment of my invention as applied to sewer construction work, and the like. It is understood that many changes, variations or modifications in structure and design will occur to one skilled in the art and that the invention can be adapted for use in many different applications by making such changes, variations or modifications. Accordingly, it is understood that such changes, variations or modifications may be made within the scope of the appended claims without departing from the spirit of the invention.

What I claim is:

1. A measuring device comprising extensible rod means including a series of telescopically arranged tube sections, a jack attached at one end of the rod means for leveling the same, measuring tape guide means attached to forward ends of the tube sections, fastening means for setting the relationship of the tube sections relative to each other in a series of extended positions, tension application means for applying tension at an extended end of the rod means for counteracting a sagging tendency thereof, and a tape measure attached to the rod means for measuring a distance from a reference point adjacent the rod means to a point laterally and downwardly projected from the reference point.

2. A measuring device according to claim 1, wherein the jack is a scissors jack.

References Cited in the file of this patent
UNITED STATES PATENTS
2,729,897    Smith _____ Jan. 10, 1956